US010030968B2

(12) United States Patent
Brunner

(10) Patent No.: US 10,030,968 B2
(45) Date of Patent: Jul. 24, 2018

(54) FLOOR ESTIMATION FOR HUMAN COMPUTER INTERFACES

(71) Applicant: YouSpace, Inc., Mountain View, CA (US)

(72) Inventor: Ralph Brunner, Cupertino, CA (US)

(73) Assignee: YouSpace, Inc., Santa Clara, CA (US)

( * ) Notice: Subject to any disclaimer, the term of this patent is extended or adjusted under 35 U.S.C. 154(b) by 256 days.

(21) Appl. No.: 15/018,048

(22) Filed: Feb. 8, 2016

(65) Prior Publication Data

US 2017/0227353 A1    Aug. 10, 2017

(51) Int. Cl.
*G01B 11/22* (2006.01)

(52) U.S. Cl.
CPC ................... *G01B 11/22* (2013.01)

(58) Field of Classification Search
CPC ........................................ G01B 11/22
See application file for complete search history.

(56) References Cited

U.S. PATENT DOCUMENTS

| | | | | |
|---|---|---|---|---|
| 8,553,939 B2* | 10/2013 | Craig | ................ | G06K 9/00369 375/240.12 |
| 8,610,665 B2* | 12/2013 | Craig | ................ | G06K 9/00369 345/158 |
| 9,438,891 B2* | 9/2016 | Mannion | ............ | H04N 13/0275 |
| 9,684,928 B2* | 6/2017 | Freeman | ............ | G06K 9/00362 |
| 9,734,405 B2* | 8/2017 | Marty | ................ | G06K 9/00724 |
| 9,754,419 B2* | 9/2017 | Petrovskaya | ......... | G06T 19/006 |
| 2012/0157207 A1* | 6/2012 | Craig | ................ | G06K 9/00369 463/36 |
| 2013/0241833 A1* | 9/2013 | Craig | ................ | G06K 9/00369 345/158 |
| 2014/0241570 A1* | 8/2014 | Onen | ..................... | G06F 3/017 382/103 |
| 2014/0363073 A1* | 12/2014 | Shirakyan | ............. | G06T 7/0075 382/154 |
| 2015/0145860 A1* | 5/2015 | Craig | ................ | G06K 9/00369 345/419 |
| 2015/0199816 A1* | 7/2015 | Freeman | ............ | G06K 9/00362 345/633 |

(Continued)

OTHER PUBLICATIONS

Jamie Shotton, et al., Real-Time Human Pose Recognition in Parts from Single Depth images, Proceedings of CVPR, Jun. 2011, IEEE, United States (Continued)

*Primary Examiner* — Laura Menz

(57) ABSTRACT

Human Computer Interfaces (HCI) may allow a user to interact with a computer via a variety of mechanisms, such as hand, head, and body gestures. Various of the disclosed embodiments allow information captured from a depth camera on an HCI system to be used to recognize such gestures. Particularly, the HCI system's depth sensor may capture depth frames of the user's movements over time. To discern gestures from these movements, the system may group portions of the user's anatomy represented by the depth data into classes. This grouping may require that the relevant depth data be extracted from the depth frame. Such extraction may itself require that appropriate clipping planes be determined. Various of the disclosed embodiments better establish floor planes from which such clipping planes may be derived.

22 Claims, 12 Drawing Sheets

(56) References Cited

U.S. PATENT DOCUMENTS

| | | | |
|---|---|---|---|
| 2015/0261184 A1* | 9/2015 | Mannion | H04N 13/0275 |
| | | | 348/41 |
| 2016/0148433 A1* | 5/2016 | Petrovskaya | G06T 19/006 |
| | | | 345/633 |
| 2016/0253844 A1* | 9/2016 | Petrovskaya | G06F 3/011 |
| | | | 345/633 |
| 2016/0288330 A1* | 10/2016 | Konolige | B25J 9/1697 |
| 2016/0289042 A1* | 10/2016 | Fang | G06T 7/10 |
| 2016/0292521 A1* | 10/2016 | Fang | B66B 1/2408 |
| 2017/0098125 A1* | 4/2017 | Marty | G06T 7/50 |
| 2017/0161561 A1* | 6/2017 | Marty | G06K 9/00724 |
| 2017/0193665 A1* | 7/2017 | Lee | G06T 7/0079 |
| 2017/0205892 A1* | 7/2017 | Petrovskaya | G06T 19/006 |
| 2017/0206712 A1* | 7/2017 | Petrovskaya | G06T 19/006 |
| 2017/0227353 A1* | 8/2017 | Brunner | G01B 11/22 |
| 2017/0228647 A1* | 8/2017 | Brunner | G06N 5/02 |

OTHER PUBLICATIONS

Jamie Shotton, et al., Efficient Human Pose Estimation from Single Depth Images. Trans. PAMI, 2012, IEEE, United States.
U.S. Appl. No. 15/018,303, filed Feb. 8, 2016.
U.S. Appl. No. 15/369,799, filed Dec. 5, 2016.
U.S. Appl. No. 15/486,218, filed Apr. 12, 2017.
U.S. Appl. No. 15/478,209, filed Apr. 3, 2017.
U.S. Appl. No. 15/478,201, filed Apr. 3, 2017.
PCT/US17/27371, Apr. 13, 2017.
PCT/US17/27449, Apr. 13, 2017.

* cited by examiner

FLOOR ESTIMATION FOR HUMAN COMPUTER INTERFACES

BACKGROUND

Human-computer interaction (HCI) systems are becoming increasingly prevalent in our society. With this increasing prevalence has come an evolution in the nature of such interactions. Punch cards have been surpassed by keyboards, which were themselves complemented by mice, which are themselves now complemented by touch screen displays, etc. Various machine vision approaches may even now facilitate visual, rather than the mechanical, user feedback. Machine vision allows computers to interpret images from their environment to, e.g., recognize users' faces and gestures. Some machine vision systems rely upon grayscale or RGB images of their surroundings to infer user behavior. Some machine vision systems may also use depth-based sensors, or rely exclusively upon depth based sensors, to recognize user behavior (e.g., the Microsoft Kinect™, Intel RealSense™, Apple PrimeSense™, Structure Sensor™ Velodyne HDL-32E LiDAR™, Orbbec Astra™, etc.).

While depth-based approaches to HCI remove certain problems common to optical systems (e.g., problematic lighting, shadows, user discoloration, etc.) depth-based approaches to HCI may also introduce their own obstacles and complexities that need to be addressed. Many depth-based systems may be located within a house, office, or other environment having dynamic and static qualities. Creating devices and observation platforms which process and interpret data from these environments to extract meaningful data remains quite challenging. Particularly, there is a need to integrate design conditions with mechanical constraints and processing capabilities to achieve a successful user experience.

BRIEF DESCRIPTION OF THE DRAWINGS

Various of the embodiments introduced herein may be better understood by referring to the following Detailed Description in conjunction with the accompanying drawings, in which like reference numerals indicate identical or functionally similar elements.

Figure 1:
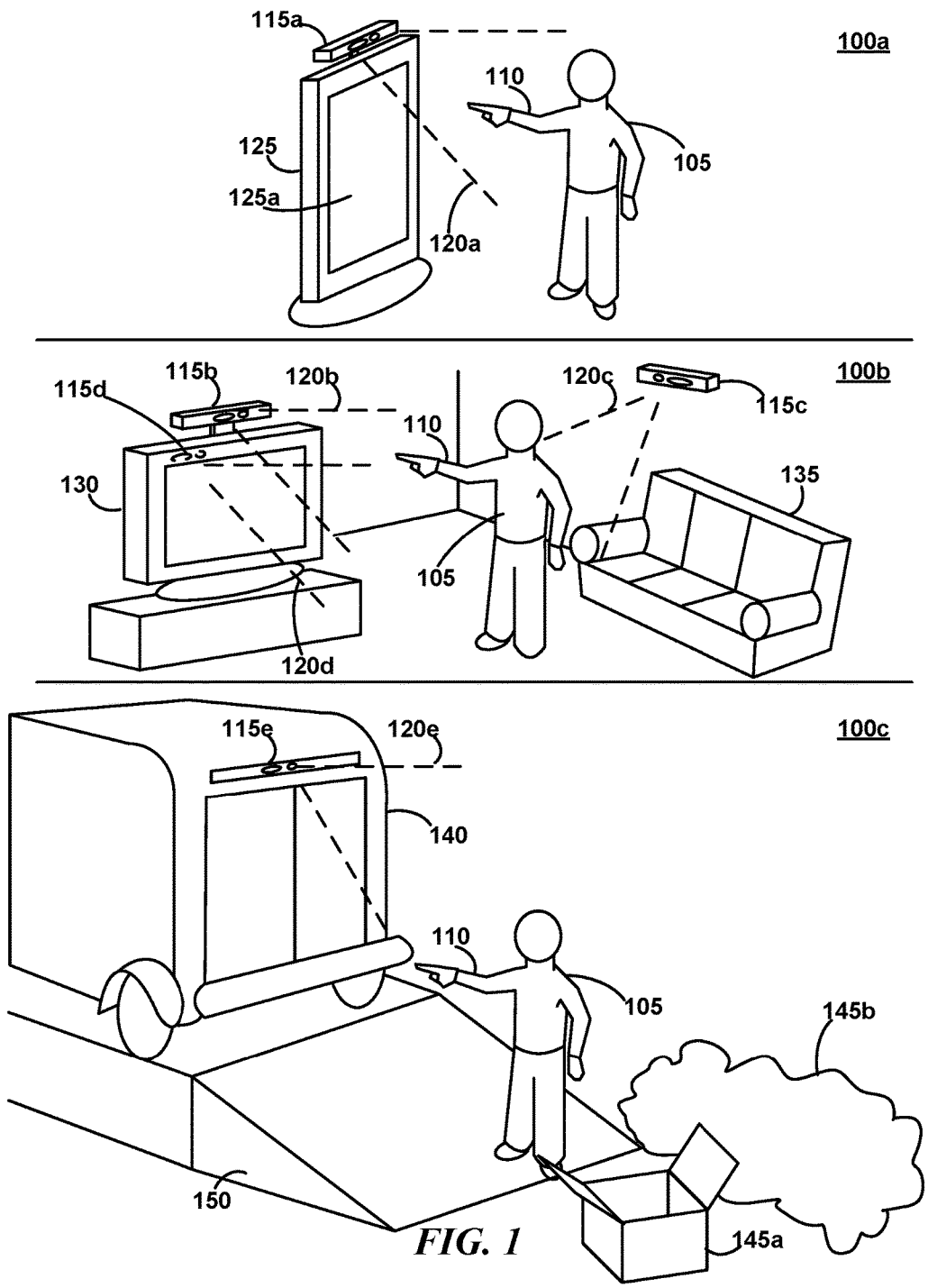
FIG. 1 is a series of use case diagrams illustrating various situations in which various of the disclosed embodiments may be implemented.

The specific examples depicted in the drawings have been selected to facilitate understanding. Consequently, the disclosed embodiments should not be restricted to the specific details in the drawings or the corresponding disclosure. For example, the drawings may not be drawn to scale, the dimensions of some elements in the figures may have been adjusted to facilitate understanding, and the operations of the embodiments associated with the flow diagrams may encompass additional, alternative, or fewer operations than those depicted here. Thus, some components and/or operations may be separated into different blocks or combined into a single block in a manner other than as depicted. The intention is not to limit the embodiments to the particular examples described or depicted. On the contrary, the embodiments are intended to cover all modifications, equivalents, and alternatives falling within the scope of the disclosed examples.

DETAILED DESCRIPTION

Example Use Case Overview

Various of the disclosed embodiments may be used in conjunction with a mounted or fixed depth camera system to detect, e.g. user gestures. FIG. 1 is a series of use case diagrams illustrating various situations 100a-c in which various of the disclosed embodiments may be implemented. In situation 100a, a user 105 is standing before a kiosk 125 which may include a graphical display 125a. Rather than requiring the user to physically touch items of interest on the display 125a the system may allow the user to "point" or "gesture" at the items and to thereby interact with the kiosk 125.

A depth sensor 115a may be mounted upon or connected to or near the kiosk 125 so that the depth sensor's 115a field of depth capture 120a encompasses gestures 110 made by the user 105. Thus, when the user points at, e.g., an icon on the display 125a by making a gesture within the field of depth data capture 120a the depth sensor 115a may provide the depth values to a processing system, which may infer the selected icon or operation to be performed. The processing system may be configured to perform various of the operations disclosed herein and may be specifically configured, or designed, for interfacing with a depth sensor (indeed, it may be embedded in the depth sensor) and outputting the processing system's results to specific hardware interface. The processing system may be located within the depth sensor 115a, within the kiosk 125, at a remote location, etc. The applications running on the kiosk 125 may simply receive an indication of the selected icon and may not be specifically designed to consider whether the selection was made via physical touch vs. depth based determinations of the selection. Thus, the depth sensor 115a and the processing system may be an independent product or device from the kiosk 125 in some embodiments.

In situation 100b, a user 105 is standing in a domestic environment which may include one or more depth sensors 115b, 115c, and 115d each with their own corresponding fields of depth capture 120b, 120c, and 120d respectively. Depth sensor 115b may be located on or near a television or other display 130. The depth sensor 115*b* may be used to capture gesture input from the user 105 and forward the depth data to an application running on or in conjunction with the display 130. For example, a gaming system, computer conferencing system, etc. may be run using display 130 and may be responsive to the user's 105 gesture inputs. In contrast, the depth sensor 115*c* may passively observe the user 105 as part of a separate gesture or behavior detection application. For example, a home automation system may respond to gestures made by the user 105 alone or in conjunction with various voice commands. In some embodiments, the depth sensors 115*b* and 115*c* may share their depth data with a single application to facilitate observation of the user 105 from multiple perspectives. Obstacles and non-user dynamic and static objects, e.g. couch 135, may be present in the environment and may or may not be included in the fields of depth capture 120*b*, 120*c*.

Note that while the depth sensor may be placed at a location visible to the user 105 (e.g., attached on top or mounted upon the side of televisions, kiosks, etc. as depicted, e.g., with sensors 115*a-c*) some depth sensors may be integrated within another object. Such an integrated sensor may be able to collect depth data without being readily visible to user 105. For example, depth sensor 115*d* may be integrated into television 130 behind a one-way mirror and used in lieu of sensor 115*b* to collect data. The one-way mirror may allow depth sensor 115*d* to collect data without the user 105 realizing that the data is being collected. This may allow the user to be less self-conscious in their movements and to behave more naturally during the interaction.

While the depth sensors 115*a-d* may be positioned parallel to a wall, or with depth fields at a direction orthogonal to a normal vector from the floor, this may not always be the case. Indeed, the depth sensors 115*a-d* may be positioned at a wide variety of angles, some of which place the fields of depth data capture 120*a-d* at angles oblique to the floor and/or wall. For example, depth sensor 115*c* may be positioned near the ceiling and be directed to look down at the user 105 on the floor.

This relation between the depth sensor and the floor may be extreme and dynamic in some situations. For example, in situation 100*c* a depth sensor 115*e* is located upon the back of a van 140. The van may be parked before an inclined platform 150 to facilitate loading and unloading. The depth sensor 115*e* may be used to infer user gestures to direct the operation of the van (e.g., move forward, backward) or to perform other operations (e.g., initiate a phone call). Because the van 140 regularly enters new environments, new obstacles and objects 145*a,b* may regularly enter the depth sensor's 115*e* field of depth capture 120*e*. Additionally, the inclined platform 150 and irregularly elevated terrain may often place the depth sensor 115*e*, and corresponding field of depth capture 120*e*, at oblique angles relative to the "floor" on which the user 105 stands. Such variation can complicate assumptions made regarding the depth data in a static and/or controlled environment (e.g., assumptions made regarding the location of the floor).

Example Depth Data

Figure 2:
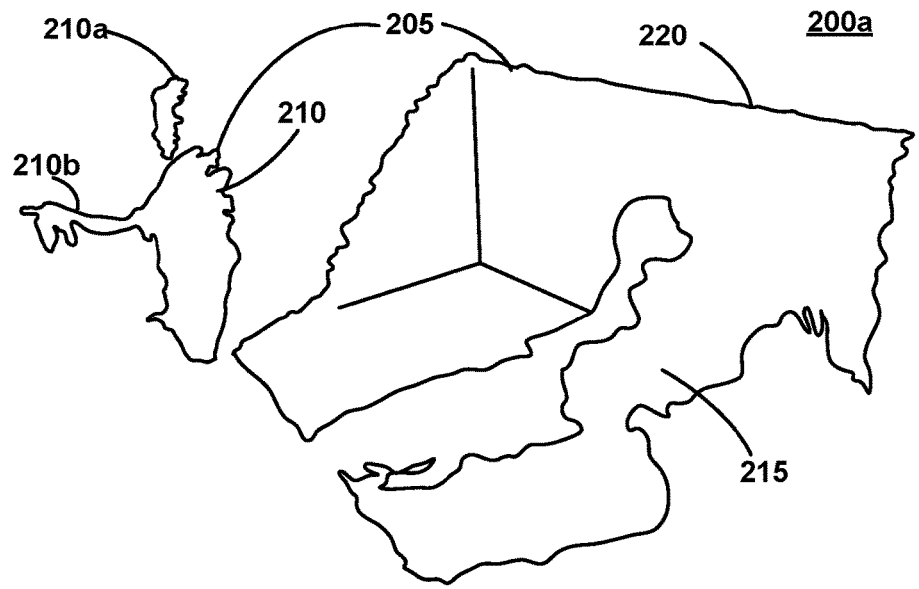
FIG. 2 is a series of perspective and side views of example depth data as may be used in some embodiments.
Figure 2:
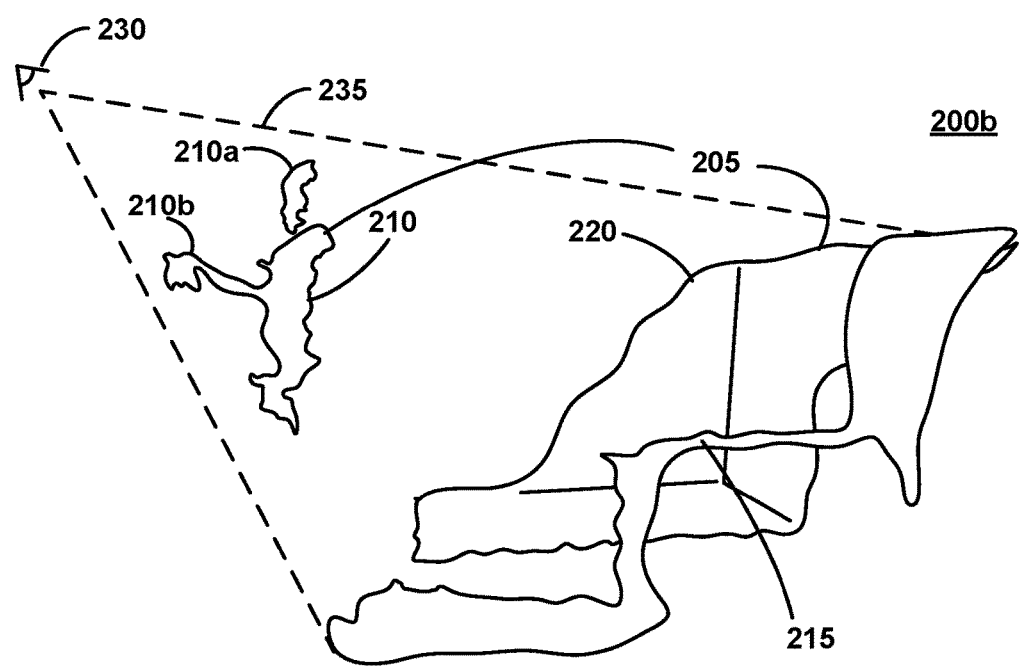

Like common optical image cameras, depth sensors 115*a-e* may capture individual "frames" of depth data over time. Each "frame" may comprise a collection of three-dimensional values for depths measured in the field of view. These may be represented, e.g., as points in three-dimensional space, as distances for rays emitted at various angles from the depth sensor, etc. FIG. 2 is a series of perspective 200*a* and side 200*b* views of example depth data 205 as may be used in some embodiments. In this example, a user is pointing at the depth sensor with his right hand while standing in front of a wall. A table to his left has also be captured in the field of view. Thus, depth values associated with the user 210 include a portion associated with the user's head 210*a* and a portion associated with the user's extended right arm 210*b*. Similarly, the background behind the user is reflected in the depth values 220, including those values 215 associated with the table.

To facilitate understanding, the side view 200*b* also includes a depiction of the depth sensor's field of view 235 at the time of the frame capture. The depth sensor's angle 230 at the origin is such that the user's upper torso, but not the user's legs have been captured in the frame.

Though FIG. 2 depicts the depth data as a "point cloud", one will readily recognize that the data received from a depth sensor may appear in many different forms. For example, a depth sensor, such as depth sensor 115*a* or 115*d*, may include a grid-like array of detectors. These detectors may acquire an image of the scene from the perspective of fields of depth captures 120*a* and 120*d* respectively. For example, some depth detectors include an "emitter" producing electromagnetic radiation. The travel time from the emitter to an object in the scene, to one of the grid cell detectors may correspond to the depth value associated with that grid cell. The depth determinations at each of these detectors may be output as a two-dimensional grid of depth values. A "depth frame" as used herein generally refers to such a two-dimensional grid, but can also refer to the more general representations of the three-dimensional depth data acquired from the depth sensor.

Example Depth Data Clipping Methodology

Figure 3:
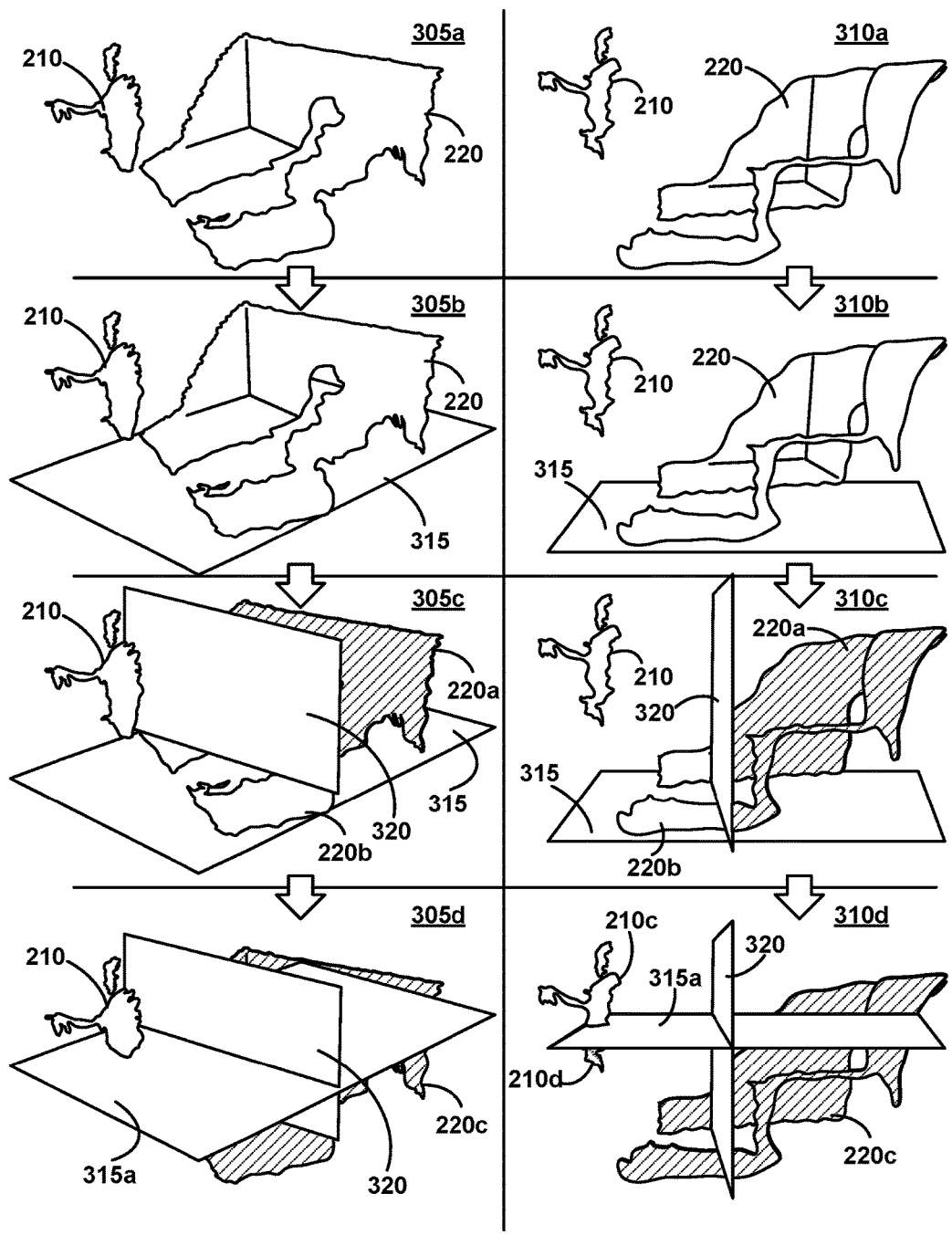
FIG. 3 is a series of views illustrating data isolation via plane clipping as may be applied to the depth data of FIG. 2 in some embodiments.

Many applications would like to infer the user's gestures from the depth data 205. Accomplishing this from the raw depth data could be quite challenging and so some embodiments apply preprocessing procedures to isolate the depth values of interest. For example, FIG. 3 is a series of views illustrating data isolation via plane clipping as may be applied to the depth data 205 of FIG. 2 in some embodiments. Particularly, perspective view 305*a* and side view 310*a* illustrate the depth data 205 (including portions associated with the user 210 and portions associated with the background 220). Perspective view 305*b* and side view 310*b* show the depth data 205 relative to a floor plane 315. The floor plane 315 is not part of the depth frame data 205. Rather, the floor plane 315 may be assumed based upon context or estimated by the processing system.

Perspective view 305*c* and side view 310*c* introduce a wall plane 320, which may also be assumed or estimated by the processing system. The floor and wall plane may be used as "clipping planes" to exclude depth data from subsequent processing. For example, based upon the assumed context in which the depth sensor is used, a processing system may place the wall plane 320 halfway to the maximum range of the depth sensor's field of view. Depth data values behind this plane may be excluded from subsequent processing. For example, the portion 220*a* of the background depth data may be excluded, but the portion 220*b* may be retained as shown in perspective view 305*c* and side view 310*c*.

Ideally, the portion 220*b* of the background would also be excluded from subsequent processing, since it does not encompass data related to the user. Some embodiments further exclude depth data by "raising" the floor plane 315 based upon context to a position 315*a* as shown in perspective view 305*d* and side view 310*d*. This may result in the exclusion of the portion 220*b* from future processing. These clipping operations may also remove portions of the user data 210d which will not contain gestures (e.g., the lower torso). Thus, only the portion 210c remains for further processing. One will recognize that FIG. 3 simply depicts one possible clipping process for a given context. Different contexts, for example, situations where gestures include the user's lower torso, may be addressed in a similar fashion. Many such operations will still require an accurate assessment of the floor 315 and wall 320 planes to perform accurate clipping.

Example Depth Data Classification Methodology

Figure 4:
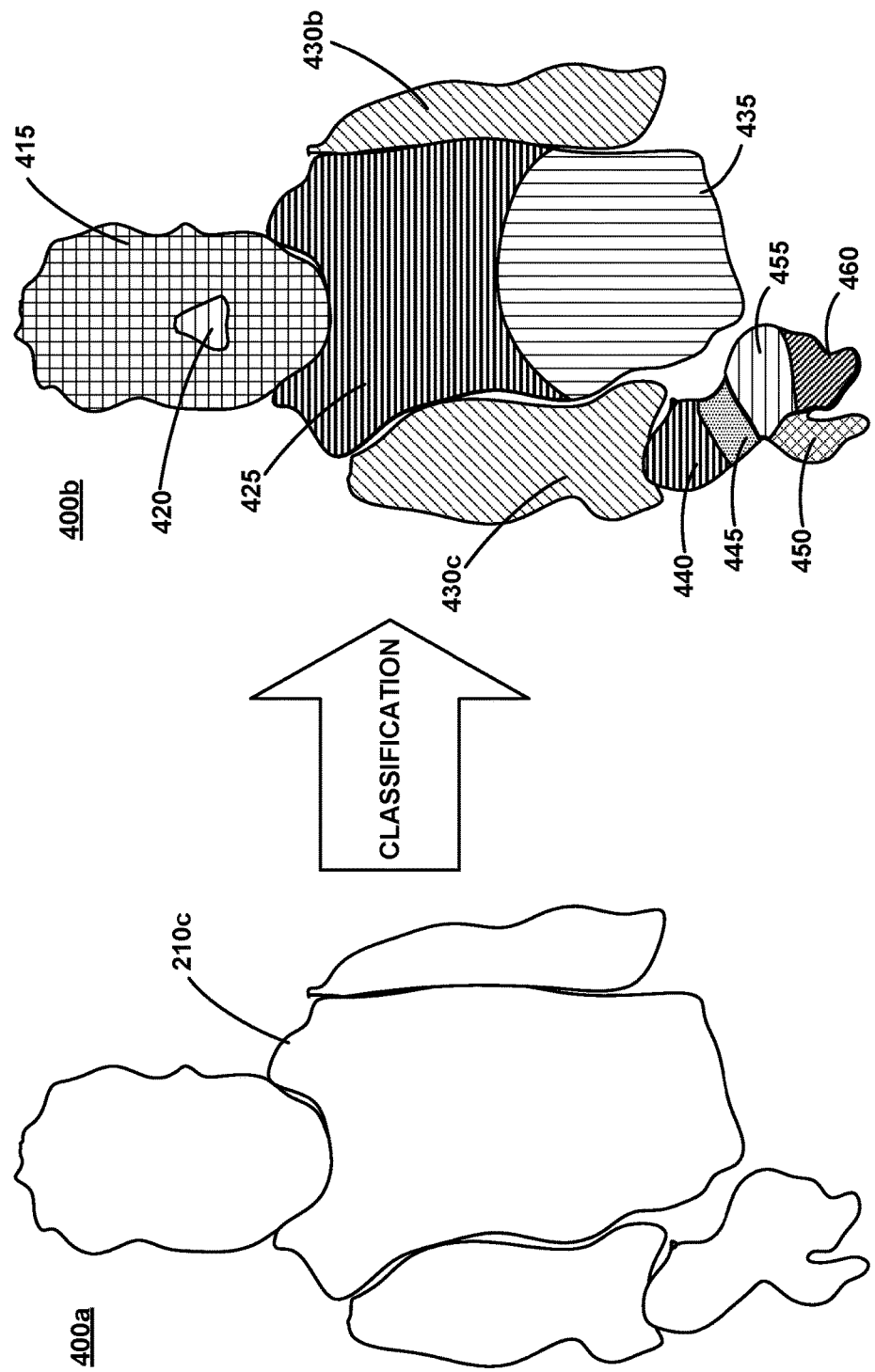
FIG. 4 is an example component classification as may be applied to the isolated data of FIG. 3 in some embodiments.

Following the isolation of the depth values which may contain gesture data of interest, the processing system may classify the depth values into various user portions. These portions, or "classes", may reflect particular parts of the user's body and can be used to infer gestures. FIG. 4 is an example component classification as may be applied to the isolated data of FIG. 3 in some embodiments. Initially 400a, the extracted data 210c may be unclassified. Following classification 400b, each of the depth values may be associated with a given classification. The granularity of the classification may reflect the character of the gestures of interest. For example, some applications may be interested in the direction the user is looking, and so may break the head into a "head" class 415 and a "nose" class 420. Based upon the relative orientation of the "head" class 415 and the "nose" class 420 the system can infer the direction in which the user's head is turned. Since the chest and torso are not generally relevant to the gestures of interest in this example, only broad classifications "upper torso" 425 and "lower torso" 435 are used. Similarly, the details of the upper arm are not as relevant as other portions and so a single class "right arm" 430c and a single class "left arm" 430b may be used.

In contrast, the lower arm and hand may be very relevant to gesture determination and more granular classifications may be used. For example, a "right lower arm" class 440, a "right wrist" class 445, a "right hand" class 455, a "right thumb" class 450, and a "right fingers" class 460 may be used. Though not shown, complementary classes for the left lower arm may also be used. With these granular classifications, the system may able to infer, e.g., a direction the user is pointing, by comparing the relative orientation of the classified depth points.

Example Depth Data Processing Pipeline

Figure 5:
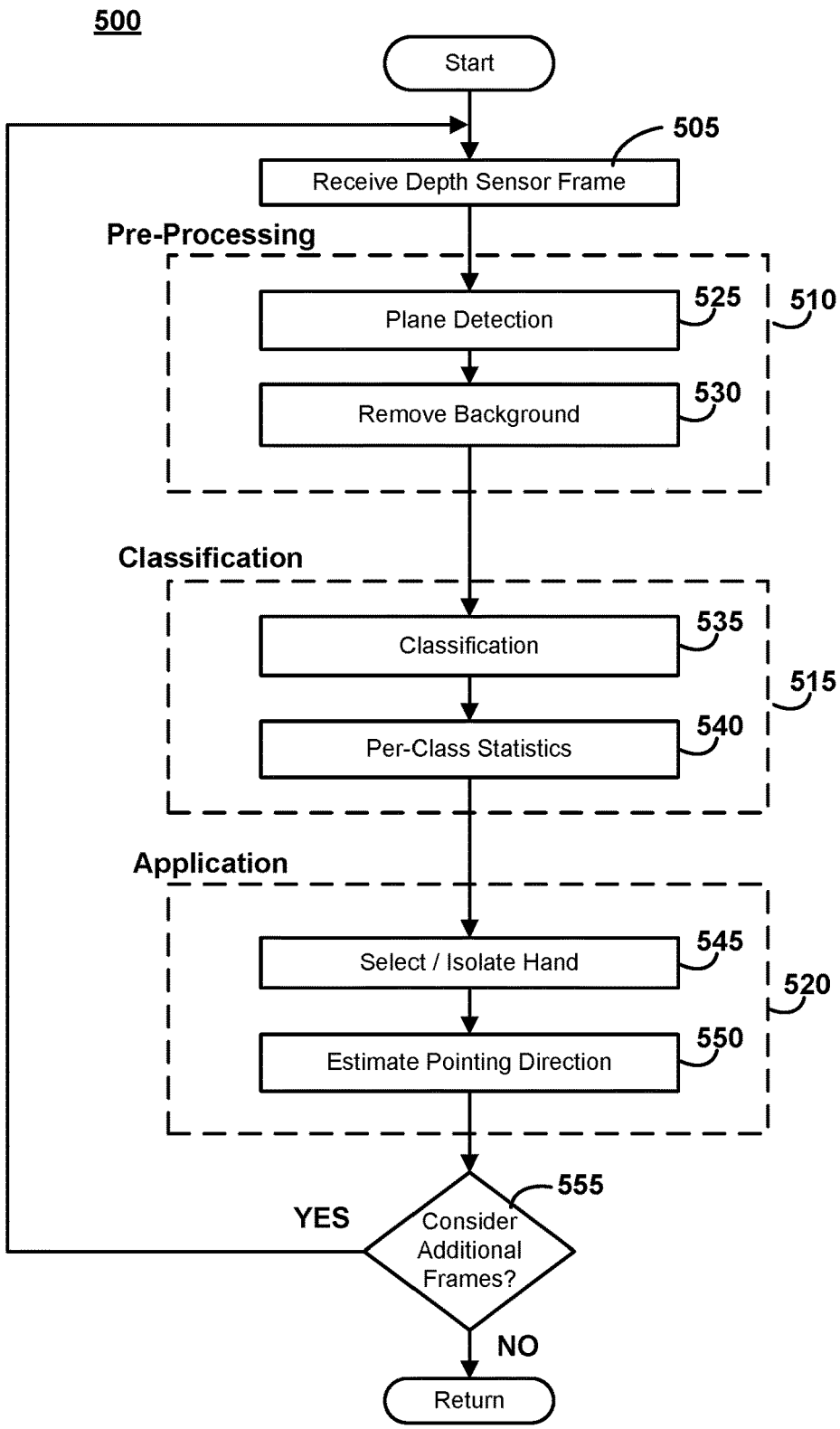
FIG. 5 is a flow diagram illustrating some example depth data processing operations as may be performed in some embodiments.

FIG. 5 is a flow diagram illustrating some example depth data processing operations 500 as may be performed in some embodiments. At block 505, the processing system may receive a frame of depth sensor data (e.g., a frame such as frame 205). Generally speaking, the data may then pass through "Pre-Processing" 510, "Classification" 515, and "Application" 520 stages. During "Pre-Processing" 510, the processing system may perform "plane detection" at block 525 using the frame data or based upon assumptions or depth camera configuration details. This may include, e.g., the clipping planes discussed with respect to FIG. 3, such as the floor 315 plane and wall plane 320. These planes may be used, e.g., to isolate the depth values of interest at block 530, e.g., as described above with respect to FIG. 3.

During Classification 515, the system may associate groups of depth values with a particular class at block 535. For example, the system may determine a classification using classes as discussed with respect to FIG. 4. At block 540, the system may determine per-class statistics (e.g., the number of depth values associated with each class, the effect upon ongoing system training and calibration, etc.). Example classes may include: Nose, Left Index Finger, Left Other Fingers, Left Palm, Left Wrist, Right Index Finger, Right Other Fingers, Right Palm, Right Wrist, and Other.

During the Application 520 operations, the system may use the class determinations to infer user-behavior relevant to a particular application objective. For example, an HCI interface may seek to determine where the user is presently pointing their hand. In this example, at block 545, the system will select/isolate the depth values classified as being associated with the "hand" and/or "fingers". From these depth values (and possibly depth values associated with the user's arm) the system may estimate the direction in which the user is pointing in this particular frame at block 550 (one will recognize that other gestures than this pointing example may also be performed). This data may then be published to an application program, e.g., a kiosk operating system, a game console operating system, etc. At block 555, the operations may be performed again for additional frames received.

Figure 6:
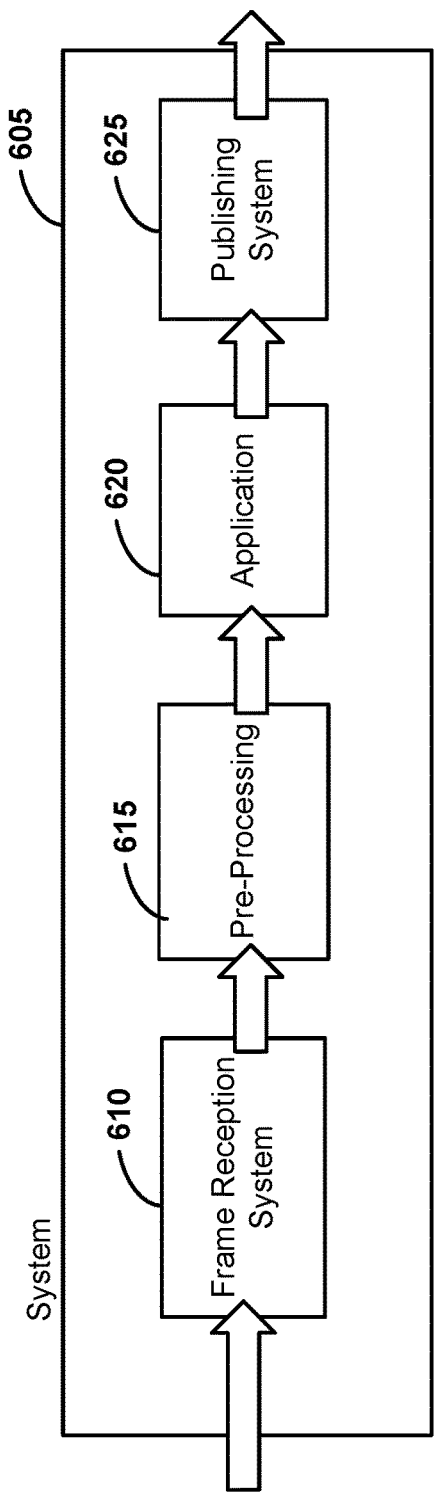
FIG. 6 is a hardware block diagram illustrating an example hardware implementation which may be used to perform depth data processing operations in some embodiments.

FIG. 6 is a hardware block diagram illustrating an example hardware implementation 605 which may be used to perform depth data processing operations in some embodiments. A frame reception system 610 may receive a depth frame from a depth sensor. The frame reception system 610 may be firmware, software, or hardware (e.g., an FPGA implementation, system-on-a-chip, etc.). The frame may be directly passed, or cached and subsequently passed, to a pre-processing module 615. Pre-processing module 615 may also be firmware, software, or hardware (e.g., an FPGA implementation, system-on-a-chip, etc.). The pre-processing module may perform the Preprocessing operations 510 discussed in FIG. 5. The pre-processing results (e.g., the isolated depth values 210c) may then be provided to the Classification module 620. The Classification module 620 may be firmware, software, or hardware (e.g., an FPGA implementation, system-on-a-chip, etc.). The Classification module 620 may perform the Classification operations 515 discussed in FIG. 5. The classified depth values may then be provided to a Publishing module 625. The Publishing module 625 may be configured to package the classification results into a form suitable for a variety of different applications (e.g., as specified at 520). For example, an interface specification may be provided for kiosk operating systems, gaming operating systems, etc. to receive the classified depth values and to infer various gestures therefrom.

Floor Estimation

Figure 7:
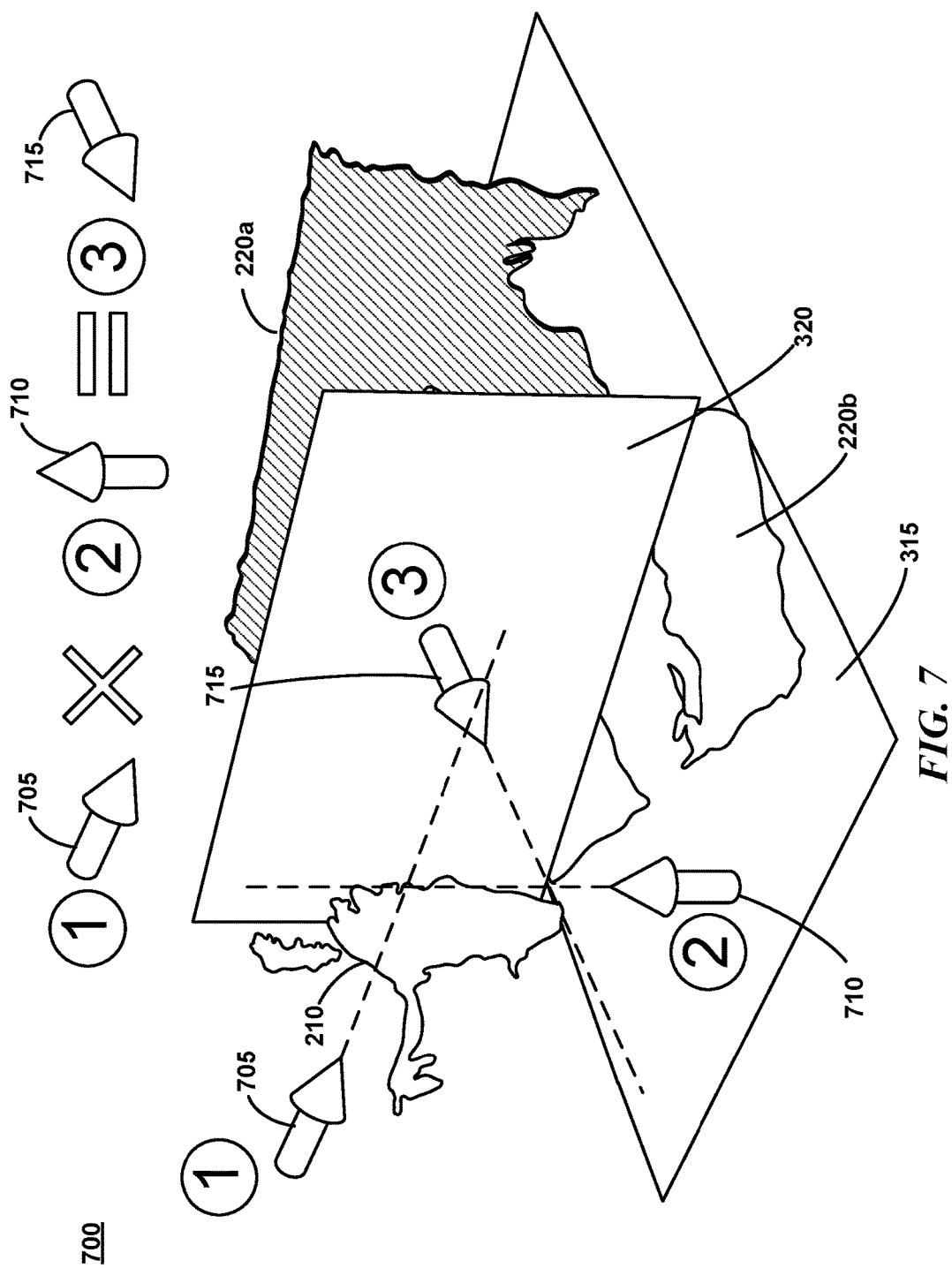
FIG. 7 is a perspective view of a wall normal determination process as may occur in some embodiments.

In some embodiments, determination of the floor plane 315 may affect the accuracy of the determination of other parameters, e.g., the wall plane 320. For example, FIG. 7 is a perspective view of a wall normal determination process 700 as may occur in some embodiments. Particularly, some embodiments may determine normal vector 715 associated with the wall plane 320 from the normal vector 710 associated with the floor plane 315 and the "X-axis" vector 705 inferred from the orientation of the depth camera. "X-axis" vector 705 may be assumed in some situations by the system, rather than inferred from the depth data. The system may determine the normal vector 715 associated with the wall plane 320 as the cross product of the "X-axis" vector 705 with the normal vector 710 associated with the floor plane 315 (this particular cross product is merely an example and one will recognize that any suitable combination may be used to infer a vector orthogonal to the plane formed by normal vectors 705 and 710). Thus, errors in the determination of the floor 315 and normal 710 may propagate into the determination of the wall plane 320. When the wall plane 320 and floor plane 315 are used as clipping planes (e.g., as described in FIG. 3) these errors may result in the undesirable inclusion or removal of portions of the depth data.

Figure 8:
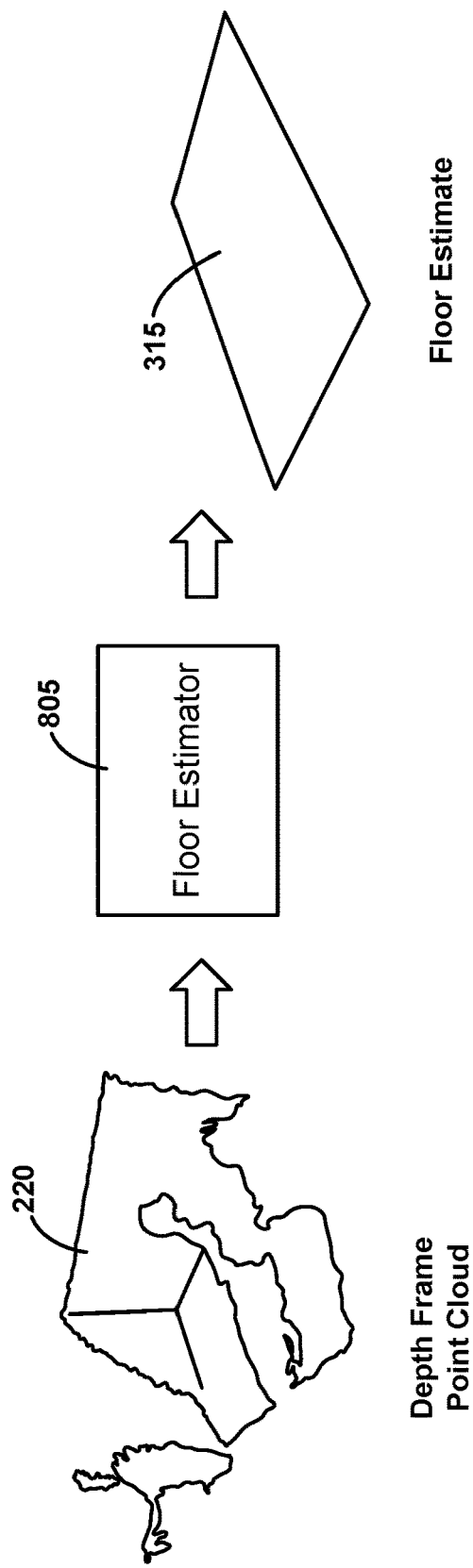
FIG. 8 is a block diagram illustrating operations in a floor estimation process as may occur in some embodiments.

To avoid such problems, some embodiments consider employing a floor estimation procedure to better determine floor plane 315. FIG. 8 is a block diagram illustrating operations in a floor estimation process as may occur in some embodiments. At a high level, a floor estimator 805 may determine a floor plane estimate 315 after receiving a frame of depth data 220.

Floor Estimation—Metric

Figure 9:
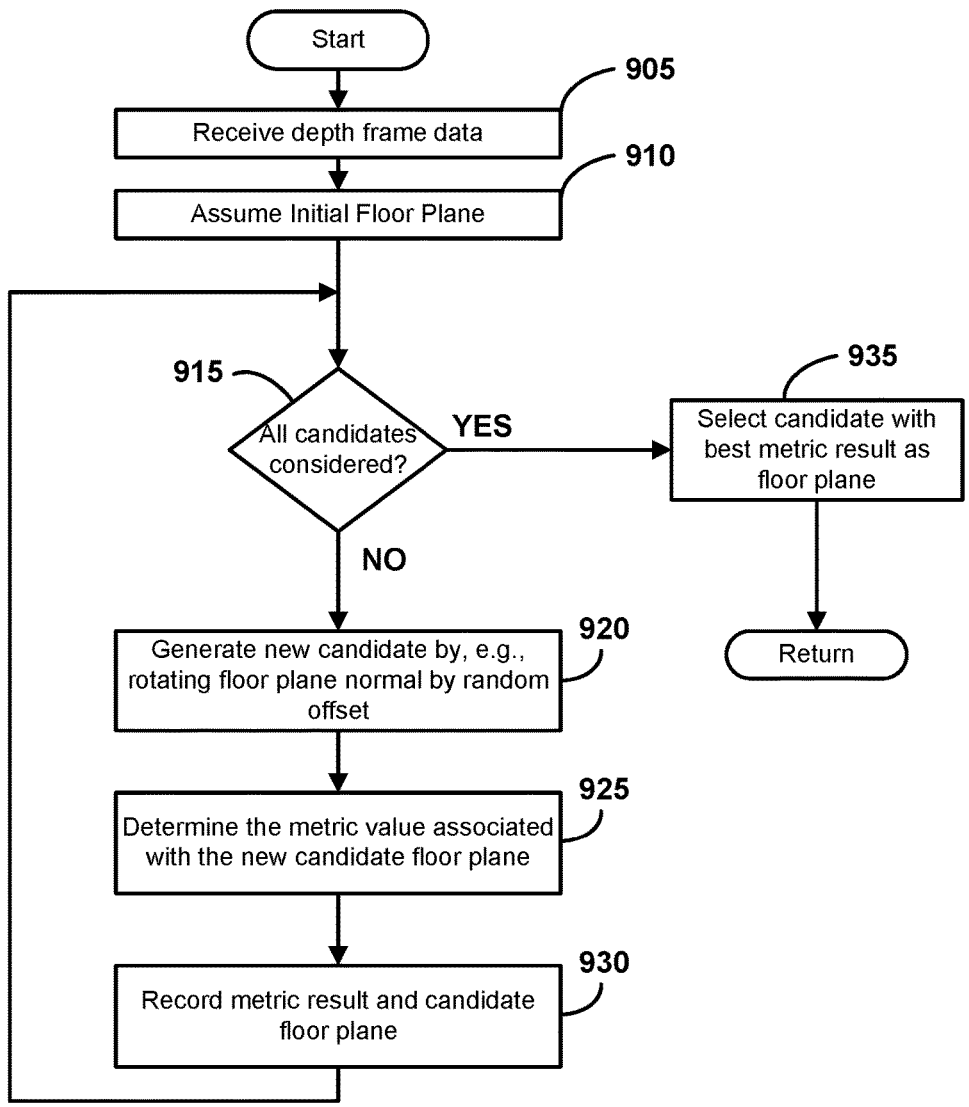
FIG. 9 is a flow diagram illustrating operations in a floor estimation process using a metric as may occur in some embodiments.

FIG. 9 is a flow diagram illustrating operations in a floor estimation process 900 using a metric as may occur in some embodiments. Such a process may occur, e.g., as part of plane detection at block 525. At block 905, the system may receive a frame of depth data (e.g., the frame acquired at block 505). At block 910, the system may make an initial estimate of the floor plane (e.g., based upon previous determinations, assumptions regarding the user environment, inertial measurement data, etc.). The system may iteratively perform blocks 920, 925, and 930, until a desired number of floor candidates have been considered at block 915.

At block 920, the system may generate a new floor plane candidate, e.g., by rotating the normal associated with the initial floor plane determined at block 910. The rotation may include components about each of the three possible dimension axes. At block 925, a metric may be applied to this floor candidate and at block 930, the results of the metric stored for comparison. One will recognize variations, e.g., where the metric is only retained against a best metric so far determined, the process stops once a metric better than a threshold is determined, etc. Successive candidates may have their respective metrics determined in this manner until a best candidate is selected at block 935.

Figure 10:
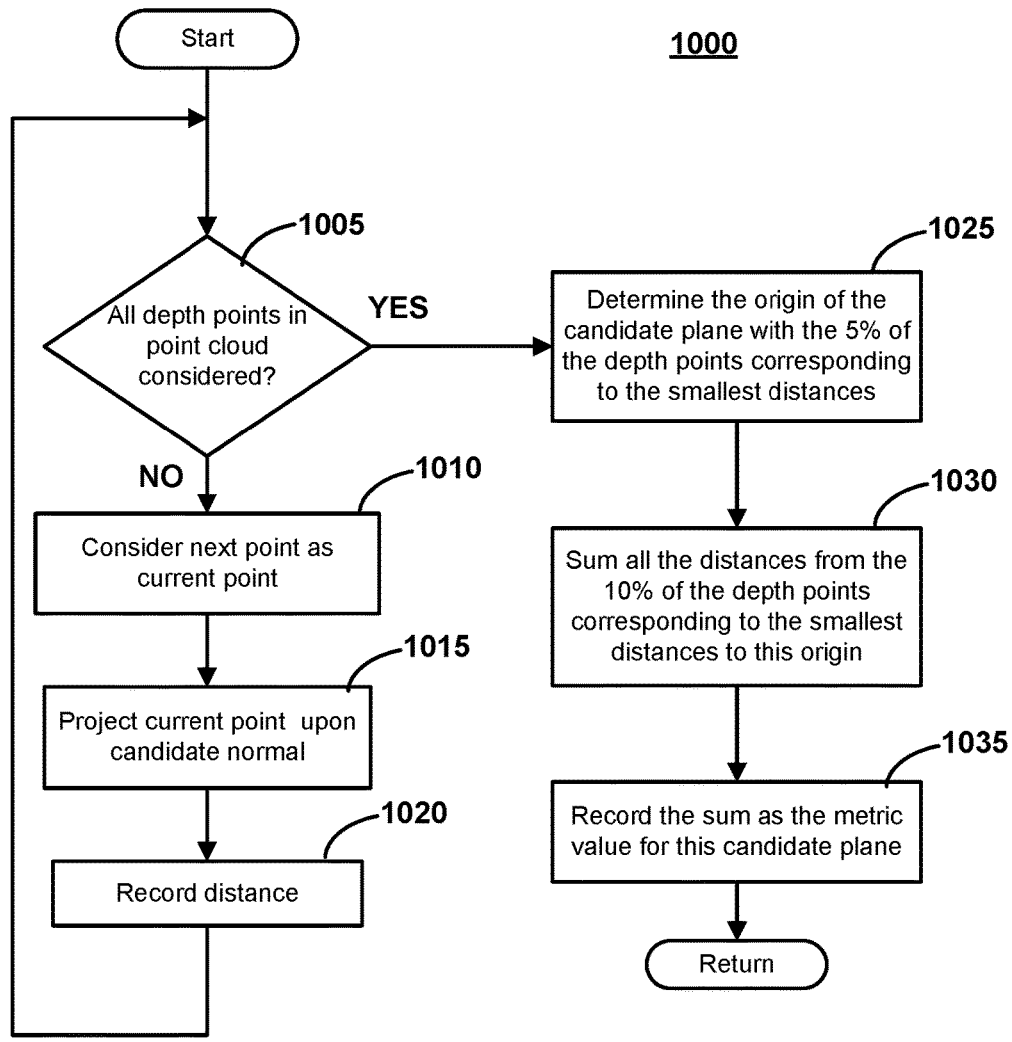
FIG. 10 is a flow diagram illustrating operations in a metric determination process as may occur in some embodiments.

FIG. 10 is a flow diagram illustrating operations in a metric determination process 1000 as may occur in some embodiments. For example, process 1000 may occur at block 925. The process 1000 may iterate over blocks 1010, 1015, and 1020 until all the depth values in the point cloud have been considered at block 1005. At block 1010 the system may select the next depth point from the point cloud that has not yet been considered as part of this metric determination. At block 1015, the system may determine the projection of the depth point upon the candidate floor plane. The system may record the distance between the projected position and the depth point at block 1020.

When all the points in the depth cloud (or a desired subset) have been considered at block 1005, the system may then determine the origin of the candidate plane from the 5% of the depth frame points associated with the best metric values (e.g., the lowest distances). For example, the origin on the candidate plane may be the projection of the mean of these 5% of the depth values upon the candidate floor plane. Though 5% is used here for illustration purposes, as well as for the results achieved with its use, one will recognize alternative thresholds that may be used in some contexts.

At block 1030, the depth values associated with the top 10% of the metric results may then be considered. The system may determine the distance from each of these depth points to the origin determined at block 1025 and sum the result. That sum may then be used as the metric value for the floor candidate at block 1035 (e.g., this may be the metric recorded at block 930).

Figure 11:
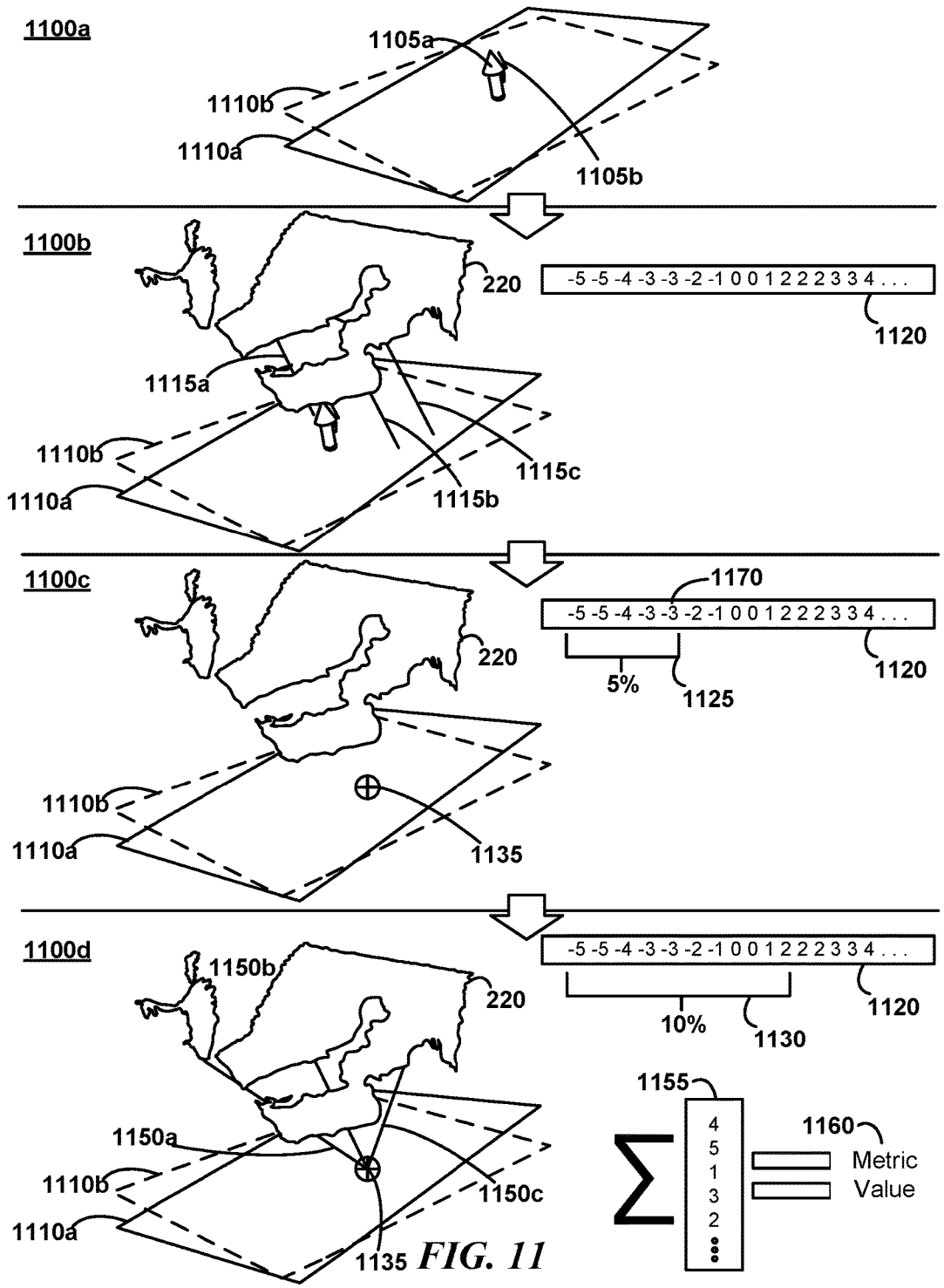
FIG. 11 is a series of views illustrating an example floor metric determination process as may occur in some embodiments.

To facilitate understanding, FIG. 11 is a series of informal views illustrating an example floor metric determination process as may occur in some embodiments. The steps in FIG. 11 may roughly correspond to operations described with respect to FIGS. 9 and 10.

At step 1100*a*, the system may apply a rotation perturbation to the normal 1105*b* of a reference floor plane 1110*b* to produce a new normal 1105*a* and corresponding candidate floor plane 1110*a*. The reference floor plane 1110*b* may be the initially determined floor plane or the current best floor plane estimate. For example, the reference floor plane 1110*b* may be the initial floor plane in the first iteration and the current best floor plane estimate in the subsequent iterations. This may correspond to the operations at block 920. At step 1100*b*, the system may begin iterating over the depth points in the frame 220 and determine the distance from each depth point (e.g., distances 1115*a*, 1115*b*, and 1115*c*) to the candidate floor plane 1100*a*. These may be the shortest distance from the points to the plane (their projected point upon the plane). These distances may be recorded in a list 1120 (though one will recognize alternative structures or processes for achieving the same effect). Note that depth points below the candidate floor plane may receive "negative" distances as indicated in the list.

At step 1100*c*, 5% of the depth points which are associated with the smallest of the distances 1125 may be used to determine an origin 1135 in the candidate floor plane 1100*a*. The origin 1135 for the new candidate floor plane may be determined, e.g., as the depth point at the 5% boundary of the depth points (e.g., the point associated with depth value 1170). While one will recognize alternative methods for determining plane origin 1135 (e.g., averaging a range of values about the 5% boundary and projecting the result) selecting the boundary depth value in this manner may have advantages in some contexts. For example, if the depth frame data includes outliers due, e.g., to noisy data (such as negative distance numbers that are unreasonably large), that noise may present a significant adverse influence on the data. Using the boundary value 1170 as the origin 1135 may eliminate the effects of such problematic data. Although "smallest" in this examples considers negative values less than positive, in some embodiments only the absolute magnitude of the distances is considered (consequently, depth points lying on the candidate plane will typically be included among the 5%). To clarify, if there were 100 depth value points, then 5 points (i.e., 5% of 100) associated with the lowest distances will be selected and used to determine origin 1135.

Some embodiments may assess the "quality" of the 5% collection of points before using that range, and perhaps its boundary value, for the floor origin. For example, if there is substantial "spread" or variance within the points of the 5% collection, this may indicate that this subset of points contains more than just floor values. Consequently, this 5% may be determined to be a poor choice for the threshold. Upon making such a determination, the system may use a larger threshold (e.g., 10%) or may forego a floor determination with this frame, relying upon a previous floor determination or an interpolation of multiple such previous determinations.

At step 1100*d*, the system may then determine a greater percentage (e.g., the 10% 1130) of the depth points having the lowest distances 1120 determined at step 1100*b*. The distances 1155 from each of the depth points in this 10% to the origin 1135 (e.g., distances 1150*a-c*) may then be summed and the result used as the metric value (though a sum is used, one will recognize that multiplying, or otherwise accumulating the distance values may also suffice). Here, the absolute values of the distances 1150*a-c* may be used for the sum (e.g., the absolute distance to the floor plane), rather than the potentially negative values below the plane appearing in collection 1120. Alternative embodiments may use the variance of the distances associated with these 10% of the points as the metric value.

Computer System

Figure 12:
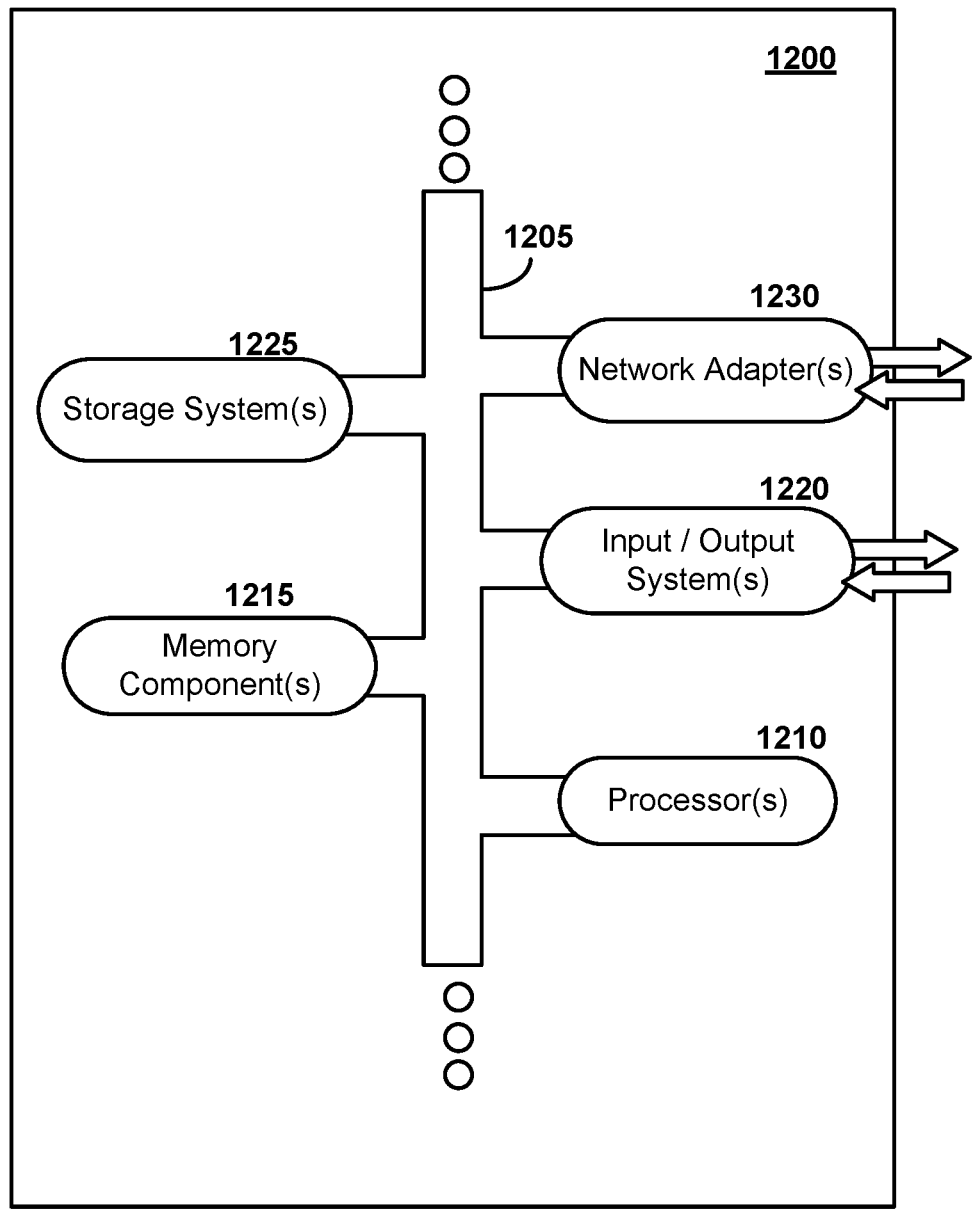
FIG. 12 is a block diagram of a computer system as may be used to implement features of some of the embodiments.

FIG. 12 is a block diagram of an example computer system as may be used in conjunction with some of the embodiments. The computing system 1200 may include an interconnect 1205, connecting several components, such as, e.g., one or more processors 1210, one or more memory components 1215, one or more input/output systems 1220, one or more storage systems 1225, one or more network adaptors 1230, etc. The interconnect 1205 may be, e.g., one or more bridges, traces, busses (e.g., an ISA, SCSI, PCI, I2C, Firewire bus, etc.), wires, adapters, or controllers.

The one or more processors 1210 may include, e.g., an Intel™ processor chip, a math coprocessor, a graphics processor, etc. The one or more memory components 1215 may include, e.g., a volatile memory (RAM, SRAM, DRAM, etc.), a non-volatile memory (EPROM, ROM, Flash memory, etc.), or similar devices. The one or more input/output devices 1220 may include, e.g., display devices, keyboards, pointing devices, touchscreen devices, etc. The one or more storage devices 1225 may include, e.g., cloud based storages, removable USB storage, disk drives, etc. In some systems memory components 1215 and storage devices 1225 may be the same components. Network adapters 1230 may include, e.g., wired network interfaces, wireless interfaces, Bluetooth adapters, line-of-sight interfaces, etc.

One will recognize that only some of the components, alternative components, or additional components than those depicted in FIG. 12 may be present in some embodiments. Similarly the components may be combined or serve dual-purposes in some systems. The components may be implemented using special-purpose hardwired circuitry such as, for example, one or more ASICs, PLDs, FPGAs, etc. Thus, some embodiments may be implemented in, for example, programmable circuitry (e.g., one or more microprocessors) programmed with software and/or firmware, or entirely in special-purpose hardwired (non-programmable) circuitry, or in a combination of such forms.

In some embodiments, data structures and message structures may be stored or transmitted via a data transmission medium, e.g., a signal on a communications link, via the network adapters 1230. Transmission may occur across a variety of mediums, e.g., the Internet, a local area network, a wide area network, or a point-to-point dial-up connection, etc. Thus, "computer readable media" can include computer-readable storage media (e.g., "non-transitory" computer-readable media) and computer-readable transmission media.

The one or more memory components 1215 and one or more storage devices 1225 may be computer-readable storage media. In some embodiments, the one or more memory components 1215 or one or more storage devices 1225 may store instructions, which may perform or cause to be performed various of the operations discussed herein. In some embodiments, the instructions stored in memory 1215 can be implemented as software and/or firmware. These instructions may be used to perform operations on the one or more processors 1210 to carry out processes described herein. In some embodiments, such instructions may be provided to the one or more processors 1210 by downloading the instructions from another system, e.g., via network adapter 1230.

REMARKS

The above description and drawings are illustrative. Consequently, neither the description nor the drawings should be construed so as to limit the disclosure. For example, titles or subtitles have been provided simply for the reader's convenience and to facilitate understanding. Thus, the titles or subtitles should not be construed so as to limit the scope of the disclosure, e.g., by grouping features which were presented in a particular order or together simply to facilitate understanding. Unless otherwise defined herein, all technical and scientific terms used herein have the same meaning as commonly understood by one of ordinary skill in the art to which this disclosure pertains. In the case of conflict, this document, including any definitions provided herein, will control. A recital of one or more synonyms herein does not exclude the use of other synonyms. The use of examples anywhere in this specification including examples of any term discussed herein is illustrative only, and is not intended to further limit the scope and meaning of the disclosure or of any exemplified term.

Similarly, despite the particular presentation in the figures herein, one skilled in the art will appreciate that actual data structures used to store information may differ from what is shown. For example, the data structures may be organized in a different manner; may contain more or less information than shown; may be compressed and/or encrypted; etc. The drawings and disclosure may omit common or well-known details in order to avoid confusion. Similarly, the figures may depict a particular series of operations to facilitate understanding, which are simply exemplary of a wider class of such collection of operations. Accordingly, one will readily recognize that additional, alternative, or fewer operations may often be used to achieve the same purpose or effect depicted in some of the flow diagrams. For example, data may be encrypted, though not presented as such in the figures, items may be considered in different looping patterns ("for" loop, "while" loop, etc.), or sorted in a different manner, to achieve the same or similar effect, etc.

Reference in this specification to "one embodiment" or "an embodiment" means that a particular feature, structure, or characteristic described in connection with the embodiment is included in at least one embodiment of the disclosure. Consequently, the phrase "in one embodiment" in various places in the specification is not necessarily referring to the same embodiment in each of those various places. Separate or alternative embodiments may not be mutually exclusive of other embodiments. One will recognize that various modifications may be made without deviating from the scope of the embodiments.

I claim:

1. A computer system configured to determine a floor plane estimation from depth frame data comprising:
    a depth sensor device configured to acquire a frame of depth data;
    at least one processor;
    at least one memory comprising instructions configured to cause the at least one processor to cause the computer system to perform a method comprising:
        receiving a frame of depth data from the depth sensor, the depth data comprising a point cloud;
        determining an initial floor plane;
        generating a plurality of candidate floor planes by:
            rotating a normal associated with a reference floor plane;
        determining a metric value for each of the plurality of candidate floor planes, wherein determining a metric value for a candidate floor plane of the plurality of candidate for planes comprises:
            determining a first plurality of distances by projecting points from the point cloud upon the candidate floor plane;

determining an origin of the candidate floor plane based upon a portion of the first plurality of distances;
determining a second plurality of distances between points in the point cloud and the origin; and
determining the metric value based upon the second plurality of distances; and
selecting the candidate floor plane associated with the best metric value as the determined floor plane.

2. The computer system of claim 1, wherein the reference floor plane is the initial floor plane in a first iteration considering a first candidate floor plane of the plurality of candidate floor planes and a previously considered candidate floor plane in a subsequent iteration considering a second candidate floor plane of the plurality of candidate floor planes.

3. The computer system of claim 1, wherein determining an origin of the candidate floor plane based upon a portion of the first plurality of distances comprises selecting a point corresponding with a distance at a percentage boundary of the first plurality of distances.

4. The computer system of claim 1, wherein rotating the normal associated with the reference floor plane comprises rotating the normal by a random amount within a range.

5. The computer system of claim 1, wherein determining an origin of the candidate floor plane based upon a portion of the first plurality of distances comprises determining an average of points corresponding to the portion of the first plurality of distances, and wherein
determining the metric value based upon the second plurality of distances comprises summing the second plurality of distances.

6. The computer system of claim 5, wherein the portion of the first plurality of distances comprises a smallest first percentage of distances of the first plurality of distances, wherein
the points in the point cloud used to determine the second plurality of distances are associated with a smallest second percentage of distances of the first plurality of distances, and wherein
the first percentage is less than the second percentage.

7. The computer system of claim 6, wherein the distances comprise absolute magnitudes of the distances from depth points to the candidate floor plane.

8. The computer system of claim 6, wherein the first percentage is 5 percent and the second percentage is 10 percent.

9. The computer system of claim 6, the method further comprising:
excluding a portion of the point cloud by raising the determined floor plane and excluding points in the point cloud below the raised determined floor plane; and
performing gesture recognition on point cloud data above the raised determined floor plane.

10. The computer system of claim 1, wherein determining an origin of the candidate floor plane based upon a portion of the first plurality of distances comprises determining an average of points corresponding to the portion of the first plurality of distances, and wherein
determining the metric value based upon the second plurality of distances comprises determining a variance of the second plurality of distances.

11. A computer-implemented method for determining a floor plane estimation from depth frame data, the depth frame data comprising a point cloud, the method comprising:
receiving a frame of depth data captured by a depth sensor;
determining an initial floor plane;
generating a plurality of candidate floor planes by:
rotating a normal associated with a reference floor plane;
determining a metric value for each of the plurality of candidate floor planes, wherein determining a metric value for a candidate floor plane of the plurality of candidate for planes comprises:
determining a first plurality of distances by projecting points from the point cloud upon the candidate floor plane;
determining an origin of the candidate floor plane based upon a portion of the first plurality of distances;
determining a second plurality of distances between points in the point cloud and the origin; and
determining the metric value based upon the second plurality of distances; and
selecting the candidate floor plane associated with the best metric value as the determined floor plane.

12. The computer-implemented method of claim 11, wherein the reference floor plane is the initial floor plane in a first iteration considering a first candidate floor plane of the plurality of candidate floor planes and a previously considered candidate floor plane in a subsequent iteration considering a second candidate floor plane of the plurality of candidate floor planes.

13. The computer-implemented method of claim 11, wherein rotating the normal associated with the initial floor plane comprises rotating the normal by a random amount within a range.

14. The computer-implemented method of claim 11, wherein determining an origin of the candidate floor plane based upon a portion of the first plurality of distances comprises determining an average of points corresponding to the portion of the first plurality of distances, and wherein
determining the metric value based upon the second plurality of distances comprises summing the second plurality of distances.

15. The computer-implemented method of claim 14, wherein the portion of the first plurality of distances comprises a first percentage portion of the smallest distances of the first plurality of distances, wherein
the points in the point cloud used to determine the second plurality of distances are associated with a smallest second percentage of distances of the first plurality of distances, and wherein
the first percentage is less than the second percentage.

16. The computer-implemented method of claim 15, wherein the first percentage is 5 percent and the second percentage is 10 percent.

17. The computer-implemented method of claim 15, the method further comprising:
excluding a portion of the point cloud by raising the determined floor plane and excluding points in the point cloud below the raised determined floor plane; and
performing gesture recognition on point cloud data above the raised determined floor plane.

18. A non-transitory computer readable medium comprising instructions configured to cause a computer system to perform a method, comprising:
receiving a frame of depth data from a depth sensor;
determining an initial floor plane;
generating a plurality of candidate floor planes by:

rotating a normal associated with a reference floor plane;
determining a metric value for each of the plurality of candidate floor planes, wherein determining a metric value for a candidate floor plane of the plurality of candidate for planes comprises:
  determining a first plurality of distances by projecting points from the point cloud upon the candidate floor plane;
  determining an origin of the candidate floor plane based upon a portion of the first plurality of distances;
  determining a second plurality of distances between points in the point cloud and the origin; and
  determining the metric value based upon the second plurality of distances; and
selecting the candidate floor plane associated with the best metric value as the determined floor plane.

19. The non-transitory computer readable medium of claim 18, wherein determining an origin of the candidate floor plane based upon a portion of the first plurality of distances comprises determining an average of points corresponding to the portion of the first plurality of distances, and wherein
determining the metric value based upon the portion of the second plurality of distances comprises summing the second plurality of distances.

20. The non-transitory computer readable medium of claim 19, wherein the portion of the first plurality of distances comprises a first percentage portion of the smallest distances of the first plurality of distances, wherein
the points in the point cloud used to determine the second plurality of distances are associated with a smallest second percentage of distances of the first plurality of distances, and wherein
the first percentage is less than the second percentage.

21. The non-transitory computer readable medium of claim 20, the method further comprising:
excluding a portion of the point cloud by raising the determined floor plane and excluding points in the point cloud below the raised determined floor plane; and
performing gesture recognition on point cloud data above the raised determined floor plane.

22. The non-transitory computer readable medium of claim 18, wherein the reference floor plane is the initial floor plane in a first iteration considering a first candidate floor plane of the plurality of candidate floor planes and a previously considered candidate floor plane in a subsequent iteration considering a second candidate floor plane of the plurality of candidate floor planes.

* * * * *